(12) United States Patent
Shimizu et al.

(10) Patent No.: US 6,270,743 B1
(45) Date of Patent: Aug. 7, 2001

(54) METHOD OF MANUFACTURING CRYSTALLINE MICROPOROUS MATERIALS

(75) Inventors: Shinichi Shimizu, Ryugasaki; Fujio Mizukami; Yoshimichi Kiyozumi, both of Tsububa, all of (JP)

(73) Assignee: Kuboto Corporation, Osaka (JP)

( * ) Notice: Subject to any disclaimer, the term of this patent is extended or adjusted under 35 U.S.C. 154(b) by 0 days.

(21) Appl. No.: 09/469,438

(22) Filed: Dec. 21, 1999

Related U.S. Application Data

(63) Continuation-in-part of application No. 09/322,687, filed on May 28, 1999, now Pat. No. 6,022,519, which is a continuation of application No. 08/649,590, filed on May 21, 1996, now abandoned.

(30) Foreign Application Priority Data

May 24, 1995 (JP) .................................................... 7-125040
May 24, 1995 (JP) .................................................... 7-125041

(51) Int. Cl.$^7$ ........................... C01B 39/02; B01J 29/072
(52) U.S. Cl. .................... 423/702; 423/704; 423/705; 423/716; 423/DIG. 22; 423/DIG. 29; 423/DIG. 25; 423/326; 423/328.2; 423/335
(58) Field of Search ..................................... 423/702, 704, 423/705, 706, 712, 716, DIG. 22, DIG. 25, DIG. 29, 326, 328.2, 335; 502/74

(56) References Cited

U.S. PATENT DOCUMENTS

| | | | |
|---|---|---|---|
| 3,094,383 | * | 6/1963 | Dzierzanowski et al. . |
| 3,100,684 | * | 8/1963 | Haden, Jr. et al. . |
| 3,306,922 | * | 2/1967 | Barrer et al. . |
| 3,314,752 | * | 4/1967 | Kerr . |
| 3,356,451 | * | 12/1967 | Michalko . |
| 3,367,886 | * | 2/1968 | Haden, Jr. et al. . |
| 3,574,539 | * | 4/1971 | Domine et al. . |
| 3,594,121 | * | 7/1971 | Weber . |
| 4,058,586 | * | 11/1977 | Chi et al. . |
| 4,160,011 | * | 7/1979 | Estea et al. . |
| 4,560,542 | * | 12/1985 | Robson . |
| 4,587,115 | * | 5/1986 | Arika et al. . |
| 5,110,573 | * | 5/1992 | Johnson . |
| 5,427,765 | * | 6/1995 | Inoue et al. ........................ 423/705 |
| 5,474,754 | * | 12/1995 | Saxton et al. ..................... 423/705 |
| 5,558,851 | * | 9/1996 | Miller ................................ 423/702 |
| 5,716,593 | * | 2/1998 | Miller ................................ 423/702 |
| 6,004,527 | * | 12/1999 | Murrell et al. .................... 423/712 |

FOREIGN PATENT DOCUMENTS

| | | | |
|---|---|---|---|
| 163 560 | * | 12/1985 | (EP) . |
| WO 94/13584 | * | 6/1994 | (WO) . |

* cited by examiner

*Primary Examiner*—David R. Sample
(74) *Attorney, Agent, or Firm*—Fulbright & Jaworski, LLP

(57) ABSTRACT

A method of manufacturing crystalline microporous material suitable for manufacturing a variety of crystalline microporous material under mild reaction conditions and under safe working environmental conditions by using simple installation. The crystalline microporous materials obtained by the present invention may be used as adsorbent agent, catalyst or separating material. According to the characterizing features of the manufacturing method of the present invention, there are provided a method of using cation compound or amine as crystallizing modifier and using, in combination, raw material including kanemite or silicon dioxide and a further method using raw material including silicon dioxide and aluminum salt. The method includes a step of mixing these components, a solid-liquid separating step for separating produced fine particles, and a crystallizing step for crystallizing the separated solid component. The invention achieves improvement in safety, economy and so on, in comparison with the coventionally practiced hydrothermal synthesis method which requires severe reaction conditions of high-temperature, high-pressure and strong alkaline. Further, the method allows freedom in adjustment of the pore diameter and allows a higher proportion of porous structure to be maintained in a product when the material is formed into a molded product.

6 Claims, No Drawings

METHOD OF MANUFACTURING CRYSTALLINE MICROPOROUS MATERIALS

This application is a continuation-in-part of U.S. Ser. No. 09/322,687 filed May 28, 1999, which is a continuation of U.S. Ser. No. 08/649,590 filed May 21, 1996, now abandoned, which is a § 371 of PCT/JP95/01985 filed Sep. 28, 1995, now abandoned, hereby incorporated by reference in their entireties.

FIELD OF THE INVENTION

The present invention relates to a method of manufacturing crystalline microporous material, and the invention relates more particularly to a method suitable for manufacturing a variety of crystalline microporous material under mild reaction conditions and under safe working environmental conditions by using simple installation. The crystalline microporous materials obtained by the present invention may be used as adsorbing agent, catalyst carrier or the like.

BACKGROUND OF THE INVENTION

Crystalline microporous material exist naturally in many varieties such as mordenite and ferrierite. Further, many kinds of artificial crystalline microporous material are known such as Zeolite-A, Zeolite-X, ZSM-Z5 (see Japanese patent Kokoku No. 46-10064), and ZSM-11 (see Japanese patent Kokoku No. 53-23280) and so on.

To manufacture the artificial crystalline microporous material described above, a method commonly referred to as "hydrothermal synthesis method" is employed which includes a mixing step to obtain an alkaline mixture liquid containing silicon dioxide ($SiO_2$), aluminum oxide, and an organic ammonium salt, and a subsequent crystallizing step to crystallize a crystalline microporous material in the inorganic material mixture liquid using high-pressure heating.

That is, according to the hydrothermal method, it has been believed that after the preparation of the mixture liquid, the heat crystallizing steps needs to be effected with the solid mixture component thereof being in the liquid. Thus, for obtaining the high-temperature and high-pressure conditions needed for crystallization, it has been necessary to place the mixture liquid in the form of liquid within a high-pressure heating container (autoclave) and then heating it.

With the conventional hydrothermal synthesis method described above, the high-pressure heating container is expensive. Also, since the inorganic mixture liquid contains alkaline metal oxide or alkaline earth metal oxide as an oxide or as an hydroxide component thereof, the liquid is very alkaline. Therefore, to prevent corrosion due to the strong alkalinity of the liquid, it has been necessary for the high-pressure heating container to be made of e.g. stainless steel or to be provided with fluorine resin surface treatment. Thus the method involves many factors which may increase the manufacturing costs of installing manufacturing equipment. In addition, when handling such strong alkaline mixture liquids as described above, it is necessary to take appropriate and sufficient measure to ensure the safety of workers engaged in the process. Therefore, the method is also considered to be very expensive synthesis method from the standpoint of safety.

Further, the crystallizing step of the hydrothermal synthesis method requires severe reaction conditions to heat the mixture liquid at a high temperature, usually from 70° C. to 200° C., and even higher in some cases, for a long period extended over a few days, even more than 10 days. This also contributed to further increase in the manufacturing costs.

Additionally, in a small-scale research and development, the use of the strong alkaline mixture liquid under such high-temperature, high-pressure conditions does not allow the use of ordinary glass containers. So, there has been a demand for an improved method which allows inexpensive synthesis of crystalline microporous material under milder conditions.

In addition to the above, crystalline microporous material obtained by hydrothermal synthesis is in the form of fine particles, which needs to be molded depending on its application. Yet, these fine particles do not have caking force or property, so the molding must be effected either sintering the material under an extremely high temperature or by using a binder in combination with the material. For this reason, the sintering at very high temperature may cause melting of the surface layer of the crystal, and the use of binder may block the pores of the porous structure. In either case, there is a decrease in the ratio of the crystalline microporous structure present in the molded material, i.e. the molded material will suffer a decrease in the ratio of the porous structure per unit weight. Consequently, the resultant molded material tends to lose such properties as adsorbent activity, and catalyst activity afforded by its porous structure.

OBJECTS AND SUMMARY OF THE INVENTION

Taking the above-described state of the art into consideration, it is a primary object of the present invention to provide an improved method which allows inexpensive synthesis of crystalline microporous material under milder reaction conditions. It is a further object to provide an inexpensive crystalline microporous material or crystalline microporous molded product obtained by the method. A still further object of the invention is to provide a crystalline microporous material which may achieve superior performance in a variety of applications.

The aforementioned objects and others are directed in part to a method of manufacturing crystalline microporous material by preparing an alkaline inorganic material mixture liquid by mixing at least one crystallization modifier selected from the group consisting of ammonium ion of the formula $R_4N^+$, wherein R is at least one selected from the group consisting of hydrogen, a $C_1$–$C_{10}$ alkyl and a $C_1$–$C_{10}$ aryl; a phosphonium ion of the formula $R_4P^+$ wherein R is as defined above, and amine; and silicon dioxide, so that the mixture liquid contains said modifier and silicon dioxide molecularly uniform therein; adjusting the pH of said alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating the solid composite particles.

Another preferred embodiment of the invention relates to a method of manufacturing crystalline microporous material by preparing an alkaline inorganic material mixture liquid by mixing at least one crystallization modifier selected from the group consisting of ammonium ion of the formula $R_4N^+$ wherein R is at least one selected from the group consisting of hydrogen, a $C_1$–$C_{10}$ alkyl and a $C_1$–$C_{10}$ aryl, a phosphonium ion of the formula $R_4P^+$ wherein R is as defined above, and amine; silicon dioxide; and aluminum component; adjusting the pH of the alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating the solid composite particles.

Yet another preferred embodiment relates to a method of manufacturing crystalline microporous material by preparing an alkaline inorganic material mixture liquid by mixing at least one crystallization modifier selected from the group consisting of ammonium ion of the formula $R_4N^+$ wherein R is at least one selected from the group consisting of hydrogen, a $C_1$–$C_{10}$ alkyl and a $C_1$–$C_{10}$ aryl, a phosphonium ion of the formula $R_4P^+$ wherein R is as defined above, and amine; silicon dioxide; and copper component; adjusting the pH of said alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

It has been discovered that with the addition of this copper component, the method of the invention can be utilized as a useful method of synthesizing catalyst. And, this method can provide crystalline microporous material having high catalytic function.

The crystalline microporous material obtained by the present invention may be used as material for adhesive agent, catalyst or separating material, more particularly, flon type cooling medium, drying agent for sulfur fluoride which is insulating medium for high-voltage electric appliances or for pneumatic brake of vehicles, or adsorbing/eliminating agent for adsorbing/eliminating nitrogenous substances from waste water or radioactive substances from radioactive waste water, or further as catalyst carrier for carrying various metal catalysts in the field of mainly e.g. petrochemical industries.

DETAILED DESCRIPTION OF THE INVENTION

The above objects are achieved by the present invention, which relates in part to a method of manufacturing crystalline microporous material including a mixing step to obtain alkaline mixture liquid including: at least one kind of crystallization modifier selected from the group consisting of 1) an ammonium ion ($R_4N^+$: R is at least one selected from the group consisting of hydrogen, and alkyl group or aryl group having carbon number of 10 or less); 2) a phosphonium ion ($R_4N^+$: R is at least one selected from the group consisting of hydrogen, $C_1$–$C_{10}$ alkyl group or $C_1$–$C_{10}$ aryl and 3) an amine; and kanemite (ideal composition formula: $NaHSi_2O_5$) as fine particles;

a solid-liquid separating step for separating the solid component of fine particles deposited in the mixture liquid from the inorganic material mixture liquid; and a crystallizing step for crystallizing, by heating, the solid component separated through the solid-liquid separation (this method will be referred to as 'manufacturing method A', hereinafter).

The crystallization modifier is preferably at least one selected from the group consisting of:

tetra-n-butylammonium ion $((n-C_4H_9)_4N^+)$;
tetra-n-propylammonium ion $((n-C_3H_7)_4N^+)$;
tetra-ethylammonium ion $((C_2H_5)_4N^+)$;
tetra-methylammonium ion $((CH_3)_4N^+)$;
n-propyltrimethylammonium ion $((n-C_3H_7)(CH_3)_3N^+)$;
benzyltrimethylammonium ion $((C_7H_7)(CH_3)_3N^+)$;
tetra-n-butylphosphonium ion $((n-C_4H_9)_4P^+)$;
1,4-dimethyl-1,4-diazabicyclo[2,2,2] octane,
pyrrolidine;
n-propylamine$(n-C_3H_7NH_2)$; and
methylquinuclidine.

The solid-liquid separating step may be effected after a neutralizing step to neutralizing the mixture liquid.

An alternative method of manufacturing crystalline microporous material according to the present invention includes the steps of a mixing step to obtain an alkaline inorganic material mixture liquid including: at least one kind of crystallization modifier selected from the group consisting of ammonium ion ($R_4N^+$: R is at least one selected from the group consisting of hydrogen $C_1$–$C_{10}$, alkyl or $C_1$–$C_{10}$; aryl; phosphonium ion ($R_4P^+$: R is at least one selected from the group consisting of hydrogen $C_1$–$C_{10}$, alkyl or $C_1$–$C_{10}$ aryl and amine; and silicon dioxide ($SiO_2$);

a solid-liquid separating step, subsequent to the mixing step, to separate the deposited solid fine particles from the inorganic material mixture liquid; and a heat crystallization step to crystallize the solid component separated from the foregoing separation step (this method will be referred to as 'manufacturing method B', hereinafter).

The crystallization modifier used in the above may be the same crystallization modifiers described for use in manufacturing method A set forth above.

The solid-liquid separating step may optionally be effected after a neutralizing the mixture liquid.

Yet another embodiments directed to a method of preparing a crystalline solid by mixing to obtain an alkaline inorganic material mixture liquid including a silicon dioxide ($SiO_2$) component and an aluminum salt; a solid-liquid separating step, subsequent to the mixing step to separate the solid component of fine particles deposited in the mixture liquid from the mixture liquid; and a heat crystallization step to crystallize the separated solid component (this method will be referred to as 'manufacturing method C', hereinafter).

In any one of manufacturing methods A, B and C, crystallization may be accomplished by heating a sealed container containing the separated solid component or by applying water vapor to the solid-liquid separated solid component. Further, the crystallization step may be conducted after the separated solid is molded.

Functions and effects of the invention will be described next.

In the case of the manufacturing methods A and B, that is when kanemite or silicon dioxide coexists with the crystallization modifier under such alkaline conditions (mixing step), the inorganic material aggregates around the crystallization modifier to form fine particles of composite material. These fine particles of composite material may be collected separately as a solid. The present invention is based on the discovery that when heated the separated composite solid component undergoes a phase change and is rendered into porous crystalline material.

More particularly, by heating the solid component to crystallize it (crystallizing step), the composite material is crystallized in a form such that the inorganic material surrounds the crystallization modifier as a core.

Consequently, heating the composite crystalline material as a solid yields a porous structure having a uniform pore diameter.

The crystallization modifier may be at least one selected from the group consisting of ammonium ion ($R_4N_+$: R is at least one selected from the group consisting of hydrogen $C_1$–$C_{10}$ alkyl or $C_1$–$C_{10}$ aryl; phosphonium ion ($R_4P^+$: R is at least one selected from the group consisting of hydrogen, $C_1$–$C_{10}$ alkyl or a $C_1$–$C_{10}$ aryl, and amine. Preferred modifiers are as described above.

The abovementioned species are preferred, but other kinds of ammonium salt, phosphonium salts, and amines may be also used.

Incidentally, if tetra-n-propylammonium salt is employed, there is obtained crystalline microporous material having MFI structure. And, if tetra-n-butylammonium is employed, there is obtained crystalline microporous material having MEL structure. Accordingly, by selecting the organic ammonium salt depending on the structure to be synthesized, it is possible to obtain crystalline microporous material having a desired pore diameter.

Further, in the case of the manufacturing method A or B, if the solid-liquid separating step is conducted after the neutralizing step, the composite material tends to be formed into fine particles and the composite solid component tends to have a desirable caking property, allowing, the material to be readily molded in advance by such simple techniques as a pressurizing operation. Therefore, if the crystallizing step is effected after the composite material is molded, a molded product having a complex shape may be readily obtained.

In the case of the manufacturing method C, an aluminum salt is added to the mixture liquid containing the silicon dioxide to render the mixture liquid alkaline (mixing step). Composite material including aluminum tends to be formed in the inorganic material mixture liquid. It has also been found for this composite material that if the solid-liquid separating and the heat crystallization step are provided, the porous material undergoes a phase change in its structure and is crystallized as porous crystal. Accordingly, with this method too, like the manufacturing methods A, B, crystalline microporous material may be obtained. Therefore, by simply heating the solid material, crystalline microporous material may be obtained.

Further, since the solid component of the composite material of the invention tends to have caking property, the material may be readily molded in advance by such simple operation as a pressurizing operation. Therefore, if the crystallizing step is effected after the composite material is molded, there is obtained an advantage that a molded product, even having a complex shape, may be readily obtained.

Further, the crystallization step may include a step of heating a sealed container into which the solid-liquid separated solid component has been introduced, or a step of supplying water vapor to the solid-liquid separated solid component. Further, the crystallization step may be, provided after the solid-liquid separated solid component is molded. With these heating methods, there is no need to heat to a high temperature under high pressure. If necessary, heating may be effected using water vapor under normal pressure. Consequently, handling of the material is facilitated and the manufacturing costs are also reduced.

As described above, according to the present invention, the crystallization of the microporous material may be effected by simply heating solid component. There is no necessity of the hydrothermal synthesis method using a high-pressure heating container. As the material may be handled in the form of solid, the handling is easier than that in the hydrothermal synthesis method in which the material is handled in the form of mixture liquid. Moreover, there is no necessity of providing the heating container with such measure as the antialkaline corrosion treatment, so that the manufacturing costs may be reduced in terms of the installation costs also. Also, a more simple safety measure may suffice for the purpose. Furthermore, since the heating crystallizing conditions may be milder than those required by conventional methods (for instance, in embodiments to be described later, conditions of 180° C. for 8 hours may be sufficient), so that the manufacturing costs be reduced in terms of the reaction condition needed for the manufacture. With the above-described effects combined, the methods according to the present invention achieve significant improvement over the conventional method with respect to the economy and safety. Further, in the case of e.g. a small-scale research and development activity, the synthesis is possible by using such a simple device as an ordinary glass container. Therefore, these methods will prove useful in e.g. development/manufacture of crystalline microporous material in small amounts and in a great variety.

The method of the present invention may be considered as a synthesis method based on phase change occurring in the structure of inorganic compound regulated by solvation cluster of organic ammonium ion. Accordingly, when the performances required of crystalline microporous material are being more and more distinguished and differentiated from one another in a variety of industries, the method of the invention will prove to be greatly useful in structural designing with higher molecular level precision.

Further, according to the present invention, there may be obtained crystalline microporous material having strong caking force, which may be readily premolded into a molded product having a complicated shape. Therefore, in comparison with the molded product made of the conventional crystalline microporous material obtained by pre-molding the raw material using a binder and then sintering this premolded material, the molded product obtained by the method of the present invention may achieve superior performance attributable to the porous structure, such as an increase in the ratio of the porous structure per unit weight. As a result, this material may prove to find new applications in those technical fields that used to deny the use of the conventionally molded products because of their poor performance.

Moreover, if the solid component of the composite material alone is molded and then crystallized, the resultant molded product will have improved dimension stability over a molded product obtained by high-temperature sintering operation. So that, the yield of the molded product will be improved and the manufacturing costs may be reduced in this respect as well.

The solid component of the composite material obtained by the method of the invention may be used as a binder. Then, if crystalline microporous material such as natural zeolite or material manufactured by a method different form the method of the invention is molded with using the solid component obtained by the method of the present invention as a binder, the resultant molded product will be formed entirely of the crystalline microporous material.

Further, by exposing the crystalline material to aluminum chloride vapor or by aluminum ion into the material, aluminum element may be introduced into the crystal structure. And, the crystalline microporous material provided with such treatment as above may be used as catalyst for use in the manufacture of ethylbenzene or praraxylene.

The following embodiments are particularly preferred embodiments of the invention, and are designated D, E, and F. In process D, the crystalline microporous material is prepared by preparing an alkaline inorganic material mixture liquid by mixing at least one crystallization modifier selected from the group consisting of ammonium ion of the formula $R_4N^+$, wherein R is at least one selected from the group consisting of hydrogen, a $C_1-C_{10}$ alkyl and a $C_1-C_{10}$ aryl; a phosphonium ion of the formula $R_4P^+$ wherein R is as defined above, and amine; and silicon dioxide, so that the mixture liquid contains said modifier and silicon dioxide molecularly uniform therein; adjusting the pH of said alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

The advantage of effecting additionally this pH adjusting step in the method disclosed in U.S. Ser. No. 09/322,687 is that it allows the solid component to be obtained in the form of fine composite particles of the inorganic material and the crystallization modifier. In the case of such particles of inorganic material, the finer the particles, hence, the greater the surface area thereof, the higher the greater its caking property, which property facilitates working the material into a product having a complicated shape, and it allows direct crystallization in the form of such complicated shape.

As will be seen from the examples below, the mixture liquid obtained by the mixing step in Process D the respective components are mixed uniformly in the molecular level. With this, there is formed the molecular complex of the crystallization modifier particles and the silicon dioxide molecules, which complex is then changed into crystalline nucleus which acts a kind of precursor of the microporous material, and this nucleus promotes the growth of the microporous material.

In preferred embodiments of process D, the conditions of the mixing step are chosen to yield a hydrolysis reaction. From the examples below, it will be understood that the formation of inorganic hydration cluster is readily promoted at this stage. This provides the advantage that precise control of the required properties of the microporous material, such as the control of the pore diameter of the microporous material, becomes readily possible.

In particularly preferred embodiments of process D, during the pH adjusting step, the pH of the alkaline mixture liquid is adjusted to be higher than 7 and lower than 10. In the case of the system comprising silicon particles, crystallization modifier particles and a solvent such as water, the process of formation of the molecular complex of the crystallization modifier molecules and the silicon particles differs between under acidic condition and under alkaline condition. In this case of the present invention, alkaline condition is preferred. This is because, under the alkaline condition, as compared with acidic condition, there is much greater possibility of formation of a structure in which one Si atom combines with the other Si atoms via O atoms (this structure will be referred hereinafter to as "Q4"), and this fact is desirable, considering the microporous material consists mainly of Q4. On the other hand, in the case of the acidic condition, this causes one-dimensional molecular polymerization between the crystallization modifier molecule and the silicon molecule, which makes the formation of Q4-like molecular complex difficult. Consequent, such acidic condition is undesirable for formation of precisely controlled microporous material. Conversely, if the alkaline property is too strong (pH >11), this will hinder the formation of such molecular complex. Therefore, in practice, it is preferred that the pH be adjusted between 7 and 10.

Process E relates to a method of manufacturing crystalline microporous material by preparing an alkaline inorganic material mixture liquid by mixing at least one crystallization modifier selected from the group consisting of ammonium ion of the formula $R_4N^+$ wherein R is at least one selected from the group consisting of hydrogen, a $C_1-C_{10}$ alkyl and a $C_1-C_{10}$ aryl, a phosphonium ion of the formula $R_4P^+$ wherein R is as defined above, and amine; silicon dioxide; and aluminum component; adjusting the pH of said alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

It was found that if aluminum component is included in the mixing step, it functions similarly to the crystallization modifier, so as to control the crystal morphology; and also this allows the useful microporous material to be formed more easily and under milder conditions than the conventional methods.

For reasons set forth in Process D above, it is preferred that the mixing step involves a hydrolysis reaction. Also, pH should be adjusted to the ranges set forth for Process D, since the same holds true for Process E.

Process F provides a method of manufacturing crystalline microporous material by preparing an alkaline inorganic material mixture liquid by mixing at least one crystallization modifier selected from the group consisting of ammonium ion of the formula $R_4N^+$ wherein R is at least one selected from the group consisting of hydrogen, a $C_1-C_{10}$ alkyl and a $C_1-C_{10}$ aryl, a phosphonium ion of the formula $R_4P^+$ wherein R is as defined above, and amine; silicon dioxide; and copper component; adjusting the pH of said alkaline inorganic material mixture liquid; subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

It has been discovered that with the addition of this copper component, the method of the invention can be utilized as a useful method of synthesizing catalyst. And, this method can provide crystalline microporous material having high catalytic function.

Next, particularly preferred embodiments of the invention will be described. The present invention is not limited to these embodiments.

DETAILED DESCRIPTION OF PREFERRED EMBODIMENT

The following raw materials were employed in all examples (all % notations are wt. %):

water glass No. 3: analyzed values: $SiO_2$: 29.17%, $Na_2O$: 9.82% (T silicate soda No. 3, manufactured by Nippon Chemical Industries Co., Ltd.);

silica powder (high purity silica powder manufactured by Tama Chemical Industries Co., Ltd.);

tetra-n-propylammonium bromide $((n-C_3H_7)_4NBr)$ (manufactured by Tokyo Kasei Industries Co., Ltd.);

tetra-n-butylammonium bromide ((n-$C_3H_9$)$_4$NBr) (manufactured by Tokyo Kasei Industries Co. Ltd.);

aluminum chloride ($AlCl_3$—$6H_2O$): (manufactured by Kishida Chemical Co., Ltd.)

benzyl trimethylammonium chloride (($C_7H_7$)($CH_3$)$_3$NCl):

(manufactured by Tokyo Kasei Industries Co. Ltd.):

tetra-n-propylammonium hydroxide ((n-$C_3H_9$)$_4$NOH) water solution: 20–25% (manufactured by Tokyo Kasei Industries Co., Ltd.)

benzyltrimethylammonium hydroxide (($C_7$ $H_7$) ($CH_3$)$_3$ NOH)

water solution: 40% (manufactured by Tokyo Kasei Industries Co., Ltd.)

aluminum-tri-sec-butoxide (Al(O—(CH($CH_3$) ($C_2H_5$))$_3$) (manufactured by Tokyo Kasei Industries Co., Ltd.)

sodium alminate ($NaAlO_2$): (manufactured by Wako Junyaku Co., Ltd.)

tetraethylorthosilicate ("TEOS", manufactured by Tokyo Kasei Industries Co., Ltd.)

tetra-n-butylammonium hydroxide (n-$C_4H_9$)$_4$ NOH) aqueous solution: 40% ("TBAOH", manufactured by Tokyo Kasei Industries Co., Ltd.)

copper acetylacetate (Cu($CH_3COCHCOCH_3$)$_2$): (manufactured by Dozin Chemical Research Institute)

EXAMPLE 1

200 g of water glass No. 3 was prepared in a 500 ml beaker and 14 g of sodium hydroxide was dissolved therein. Thereafter, the mixture was placed onto an evaporating dish made of alumina. This dish was introduced into a thermostatic oven maintained at 150° C. to evaporate the water content of the mixture. The resultant product obtained after the water content evaporation, together with the evaporating dish, was introduced into an electric furnace to be sintered therein at 700° C. for about 7 hours. Then, the sintered product was allowed to be cooled to the room temperature, whereby a reaction product was obtained. This reaction product was submerged in 700 ml water in a beaker, whereby fine particle precipitation was obtained. The fine particle precipitation was collected by means of filtration under reduced pressure, rinsed with deionized water, and then air-dried at room temperature, whereby about 60 g of kanemite (ideal composition formula: $NaHSi_2O_5 3H_2O$) was obtained.

Tetra-n-propylammonium bromide 5.32 g was added with deionized water to obtain 200 g of solution. Into this solution, 10 g of the above-described kanemite was uniformly dispersed and heated up to 70° C. and left still for 3 hours (mixing step). Then, after radiationally cooling the solution to the room temperature, 2M (mol/l) of hydrochloric acid was added thereto to gradually lower the pH value of the mixture solution to 8 approximately, when there occurred sudden bulging in the volume of kanemite (pH adjusting step). This phenomenon is believed to be attributable to an ion-exchange reaction occurring between sodium ion contained in kanemite and tetra-n-butyl-ammonium (n-$C_4H_9$)$_4$N$^+$) ion. Then, this bulged kanemite was collected by means of filtration under reduced pressure, rinsed with deionized water, and then air-dried at the room temperature, whereby white powder material substantially free from water content other than adsorbed water was obtained (solid-liquid separating step). This white powder material is believed to be complex material of kanemite and tetra-n-propylammonium ion.

About 1 g of the above-described complex material was placed on a small glass filter and this glass filter, together with about 7 g of deionized water, was placed into a pressure-resistant container having an inner surface thereof coated with fluorine resin. Then, a heating operation was effected for eight hours by using steam at 130° C. without directly exposing the complex material to the water, whereby a reaction product was obtained (crystallizing step). A powder X-ray diffraction spectrum analysis effected on this reaction revealed that the product was crystalline microporous material comprised of silicalite-1 having the MFI structure.

EXAMPLE 2

6.44 g of tetra-n-butylammonium bromide was added with deionized water to prepare 200 g of solution. And, log of kanemite manufactured in Example 1 was dispersed in the solution and heated to 70° C. and then allowed to be cooled to the room temperature. Thereafter, 2 mol/l of hydrochloric acid was added thereto to gradually lower the pH value to 8 approximately (complex material forming step and pH adjusting step). In this case too, like Example 1, sudden bulging in the volume of kanemite was observed. This phenomenon is believed to be attributable to an ion-exchange reaction occurring between sodium ion contained in kanemite and tetra-n-butyl-ammonium (N—$C_4H_9$)$_4$N$^+$) ion. Then, this bulged kanemite was collected by means of filtration under reduced pressure, rinsed with deionized water, and air-dried at the room temperature, whereby white powder material substantially free from water content other than adsorbed water was obtained (solid-liquid separating step). This white powder material is believed to be complex material of kanemite and tetra-n-butylammonium ion (n-$C_4H_9$)$_4$N$^+$).

Like Example 1, on this complex material, a heating operation was effected by exposing the material to steam at 130° C. for 24 hours, whereby a reaction product was obtained (crystallizing step). A powder X-ray diffraction spectrum analysis effected on this reaction product revealed that the product was crystalline microporous material comprised of silicalite-2 having the MEL structure.

EXAMPLE 3

100 g of water glass No. 3 was added with 100 g of deionized water to be diluted thereby, to which 16 g of tetra-n-butylammonium bromide was added and the mixture solution was stirred well, whereby inorganic material mixture liquid in the form of soft gel whose respective components are uniformly mixed in the molecular level was obtained (mixing step). With addition thereto of about 12 g of conc. hydrochloric acid, the soft gel was rendered into harder gel (pH adjusting step). Supernatant liquid of this gel was found to have a pH value of 8 approximately. After this hard gel was rinsed sufficiently with deionized water, the gel was collected by means of filtration under reduced pressure and then air-dried at the room temperature, whereby powder material substantially free from water content other than adsorbed water was obtained (solid-liquid separating step). This powder material is believed to comprise complex material of water glass and tetra-n-butylammonium ion ((n-$C_4H_9$)$_4$N$^+$).

The above-described powder material was put into a test tube made of hard glass and this test tube was sealed in the air. Then, this test tube was heated for 40 hours in a thermostatic oven maintained at 130° C. and then allowed to be cooled to the room temperature, whereby a reaction product was obtained out of the test tube (crystallizing step).

A powder X-diffraction spectrum analysis effected on this reaction product revealed that the product comprised crystalline microporous material comprised of silicalite-2 having the MEL structure.

EXAMPLE 4

The powder complex material substantially free from water content other than adsorbed water manufactured by the same method as Example 1 was put into a test tube made of hard glass and this test tube was sealed in the air. Then, the test tube was heated for 20 hours in a thermostatic oven maintained at 130° C. and then allowed to be cooled to the room temperature, whereby a reaction product was obtained (crystallizing step). The reaction product was taken out of the test tube, and a powder X-ray diffraction spectrum analysis of this reaction product revealed that the product was crystalline microporous material comprised of silicalite-1 like that of Example 1.

EXAMPLE 5

The powder complex material substantially free from water content other than adsorbed water manufactured by the same method as Example 1 was subjected to a uniaxial compression at 500 MPa by using a hydraulic press, whereby a molded product was obtained. Then, this molded product was put into a test tube made of hard glass and the test tube was sealed in the air. Then, this test tube was heated for 20 hours in a thermostatic oven maintained at 130° C. (crystallizing step). Incidentally, after the radiational cooling thereof to the room temperature, the reaction product was taken out of the test tube and the product was checked whether it exhibited any deformation or not. But, no deformation was observed. The reaction product was taken out of the test tube and a powder X-ray diffraction spectrum analysis effected on this reaction product revealed that the product was crystalline microporous material comprised of silicalite-1 like that of Example 1.

EXAMPLE 6

The powder complex material substantially free from water content other than adsorbed water manufactured by the same method as Example 1 was exposed to air steam at 130° C. under the normal pressure for 20 hours, whereby a reaction product was obtained (crystallizing step). A powder X-ray diffraction spectrum analysis effected on this reaction product revealed that the product was crystalline microporous material comprised of silicalite-1 like that of Example 1.

EXAMPLE 7

Tetrapropylammonium bromide 5.32 g was added with deionized water to obtain 200 g of solution. Into this solution, 10 g of the kanemite manufactured in Example 1 was dispersed and heated up to 70° C. and left still for 3 hours (mixing step). Then, this mixture solution was added with 20 g solution prepared by adding deionized water to 0.97 g of aluminum chloride and added further with hydrochloric acid so as to adjust its pH value to 8 (pH adjusting step). In the above, 3.64 g of 2N hydrochloric acid was necessary. The pH-adjusted mixture solution described above was filtered under reduced pressure and rinsed with deionized water. Thereafter, the solution was air-dried at the room temperature, whereby powder material substantially free from water content other than adsorbed water was obtained (solid-liquid separating step). This powder material is believed to be complex material of kanemite and tetra-n-propylammonium ion.

The above-described powder material was put into a test tube made of hard glass and this test tube was sealed in the air. Then, the test tube was heated for 53 hours in a thermostatic oven maintained at 130° C., whereby a reaction product was obtained (crystallizing step). A powder X-ray diffraction spectrum analysis and analysis using 27Al-NMR were effected on this reaction product. Then, a tetracoordinated aluminum was confirmed and the product was identified as crystalline microporous material comprised of ZSM-5.

EXAMPLE 8

100 g of water glass No. 3 was added with 100 g of deionized water to be diluted thereby, to which 13 g oftetra-n-propylammonium bromide and 2.3 g of aluminum chloride were added and the mixture solution was stirred well, whereby inorganic material mixture liquid in the form of soft gel whose respective components are uniformly mixed in the molecular level was obtained (mixing step). (This phenomenon is believed to be attributable to hydrolysis of tetraethylorthosilicate and subsequent condensation thereof in association with desorption of ethanol). With addition thereto of about 16 g of conc. hydrochloric acid, the soft gel was changed into harder gel (pH adjusting step). Supernatant liquid of this gel was found to have a pH value of 8 approximately. After this hard gel was rinsed sufficiently with deionized water, the gel was collected by means of filtration under reduced pressure and then air-dried at the room temperature, whereby white powder material substantially free from water content other than adsorbed water was obtained (solid-liquid separating step). This material is believed to be complex material of water glass, tetra-n-propylammonium ion and aluminum chloride.

The above-described powder material was put into a test tube made of hard glass and this test tube was sealed in the air. Then, the test tube was heated for 24 hours in a thermostatic oven maintained at 150° C. and then allowed to be cooled to the room temperature, whereby a reaction product was obtained (crystallizing step).

A powder X-ray diffraction spectrum analysis effected on this reaction product revealed that the product comprised crystalline microporous material comprised of ZSM-5 having the MFI structure.

EXAMPLE 9

83.3 g of tetraehylorthosilicate, 16.7 g of water solution of benzyltrimethylammonium hydroxide, 4.9 g of aluminum-tri-sec-butoxide $(Al(O-(CH(CH_3)(C_2H_5))_3)$, and 20 g of ethanol were mixed together and heated for one hour at 80 üÄ, whereby inorganic material mixture liquid in the form of gel whose respective components are uniformly mixed in the molecular level was obtained (mixing step). (This phenomenon is believed to be attributable to hydrolysis of tetraethylorthosilicate and subsequent condensation thereof in association with desorption of ethanol). The inorganic material mixture liquid was filtered under reduced pressure and rinsed well and then air-dried, whereby white powder material substantially free from water content other than adsorbed water was obtained (solid-liquid separating step).

A fluorescence X-ray spectrum analysis effected on this powder material showed that the material had Si/Al element ratio of 95:5. Therefore, this material is believed to be complex material of amorphous silicon dioxide, aluminum oxide and bezyltrimethylammonium ion $((C_7H_7)(CH_3)_3N^+)$.

The powder complex material was put into a test tube made of hard glass and this test tube was sealed in the air. Then, the test tube was heated for 530 hours in a thermostatic oven maintained at 150 uÅ and then allowed to be radiationally cooled to the room temperature, whereby a reaction product was obtained (crystallizing step).

A power X-ray diffraction spectrum analysis effected on this reaction product revealed that the product comprised crystalline microporous material comprised of mordenite having MOR structure.

EXAMPLE 10

83.3 g of tetraethylorthosilicate, 36.2 g of water solution of tetrapropylammonium hydroxide and 1 g of copper acetylacetate were mixed together and heated for one hour at 80° C., whereby inorganic material mixture liquid in the form of gel whose respective components are uniformly mixed in the molecular level was obtained (mixing step). (This phenomenon is believed to be attributable to hydrolysis of tetraethylorthosilicate and subsequent condensation thereof in association with desorption of ethanol). The inorganic material mixture liquid was filtered under reduced pressure and then rinsed well with acetone and air-dried, whereby green-colored powder material substantially free from water content other than adsorbed water was obtained (solid-liquid separating step). This powder material is believed to comprise complex material of amorphous silicon dioxide and tetra-n-propylammonium ion, containing copper acetylacetate.

The powder complex material was put into a test tube made of hard glass and this test tube was sealed in the air. Then, the test tube was heated for 24 hours in a thermostatic oven maintained at 150° C. and then allowed to be radiationally cooled to the room temperature, whereby a reaction product was obtained (crystallizing step).

A powder X-ray diffraction spectrum analysis effected on this reaction product revealed that the product comprised crystalline microporous material comprised of silicalite-1 having the MFI structure. It is believed that this crystalline microporous material includes copper acetylacetonate and can be used as a catalyst for e.g. denitration reaction.

We claim:

1. A method of manufacturing crystalline microporous material, comprising:

preparing an alkaline inorganic material mixture liquid by mixing at least one crystallization modifier selected from the group consisting of ammonium ion of the formula $R_4N^+$ wherein R is at least one selected from the group consisting of hydrogen, a $C_1$–$C_{10}$ alkyl and a $C_1$–$C_{10}$ aryl, a phosphonium ion of the formula $R_4P^+$ wherein R is as defined above, and amine; and silicon dioxide, so that the mixture liquid contains said modifier and silicon dioxide molecularly uniform therein;

adjusting the pH of said alkaline inorganic material mixture liquid;

subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

2. The method of claim 1, wherein said mixing step involves a hydrolysis reaction.

3. The method of claim 1, wherein in said pH adjusting step, the pH of the alkaline mixture liquid is adjusted to from 7 to less than 10.

4. A method of manufacturing crystalline microporous material, comprising:

preparing an alkaline inorganic material mixture liquid by mixing at least one crystallization modifier selected from the group consisting of ammonium ion of the formula $R_4N^+$ wherein R is at least one selected from the group consisting of hydrogen, a $C_1$–$C_{10}$ alkyl and a $C_1$–$C_{10}$ aryl, a phosphonium ion of the formula $R_4P^+$ wherein R is as defined above, and amine; silicon dioxide; and aluminum component;

adjusting the pH of said alkaline inorganic material mixture liquid;

subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

5. The method of claim 4, wherein said mixing step involves a hydrolysis reaction.

6. A method of manufacturing crystalline microporous material, comprising:

preparing an alkaline inorganic material mixture liquid by mixing at least one crystallization modifier selected from the group consisting of ammonium ion of the formula $R_4N^+$ wherein R is at least one selected from the group consisting of hydrogen, a $C_1$–$C_{10}$ alkyl and a $C_1$–$C_{10}$ aryl, a phosphonium ion of the formula $R_4P^+$ wherein R is as defined above, and amine; silicon dioxide; and copper component;

adjusting the pH of said alkaline inorganic material mixture liquid;

subsequently to said pH adjusting step, separating the solid component of fine complex particles deposited in the mixture liquid from this inorganic material mixture liquid; and crystallizing the separated solid complex particles substantially free from water content other than adsorbed water by heating said solid composite particles.

* * * * *

UNITED STATES PATENT AND TRADEMARK OFFICE
CERTIFICATE OF CORRECTION

PATENT NO. : 6,270,743 B1
DATED : August 7, 2001
INVENTOR(S) : Shinichi et al.

Page 1 of 1

It is certified that error appears in the above-identified patent and that said Letters Patent is hereby corrected as shown below:

Column 6,
Line 12, after "costs" insert -- may --.

Column 8,
Line 31, change "ofmanufacturing" to -- of manufacturing --.

Column 10,
Line 16, change "log" to -- 10g --.

Column 12,
Line 16, change "oftetra" to -- of tetra --.

Signed and Sealed this

Twelfth Day of March, 2002

Attest:

JAMES E. ROGAN
*Director of the United States Patent and Trademark Office*

*Attesting Officer*